July 24, 1962 M. M. SEELOFF 3,046,384
FLASH WELDING AND TRIMMING APPARATUS
Filed May 4, 1960 3 Sheets-Sheet 1

INVENTOR
MELVIN M. SEELOFF

BY *Francis J. Klempay*
ATTORNEY

July 24, 1962 M. M. SEELOFF 3,046,384
FLASH WELDING AND TRIMMING APPARATUS
Filed May 4, 1960 3 Sheets-Sheet 2

INVENTOR
MELVIN M. SEELOFF

July 24, 1962 M. M. SEELOFF 3,046,384
FLASH WELDING AND TRIMMING APPARATUS
Filed May 4, 1960 3 Sheets-Sheet 3

INVENTOR
MELVIN M. SEELOFF
BY *Francis J. Klempay*
ATTORNEY

United States Patent Office 3,046,384
Patented July 24, 1962

3,046,384
FLASH WELDING AND TRIMMING APPARATUS
Melvin M. Seeloff, Warren, Ohio, assignor to The Taylor-Winfield Corporation, Warren, Ohio, a corporation of Ohio
Filed May 4, 1960, Ser. No. 26,792
6 Claims. (Cl. 219—97)

The present invention relates generally to the welding art and more particularly to improved flash welding and trimming apparatus.

In the welding art it is well known to provide a flash welder for joining the adjacent ends of workpieces, such as metal strips, for example. During a flash welding operation the adjacent ends of the workpieces are softened and then abutted under considerable pressure to complete the weld therebetween. This results in a certain amount of welding flash or expulsion at the line of weld which, in some cases, is objectionable. To remove the welding flash the welded workpieces are transferred to separate flash trimming apparatus.

It is the primary or ultimate object of the invention to provide flash welding and trimming apparatus which is characterized by its extreme simplicity in manufacture and construction but which is adapted to join the adjacent ends of workpieces and remove the excess welding flash in a minimum of time. As will be hereinafter more fully apparent, the welding and trimming means are embodied in the same machine and the flash trimming assemblies are an integral part of the welding die assemblies whereby the spacing between these means is substantially reduced when compared to prior art apparatus for a similar purpose. This, in combination with other features of the apparatus herein disclosed allows the flash welding and trimming operations to be completed in an efficient manner and in a minimum of time which is particularly important when apparatus of this type is employed in a continuous processing line.

Another object of the invention is to provide flash welding and trimming apparatus wherein the clamping platens of the trimming means firmly clamp the trailing workpiece during welding operations and wherein the electrode bars of the welding means assist in clamping and holding the welded workpieces during flash trimming operations. In this manner the workpieces are positively clamped during the welding and trimming operations.

The above, as well as other objects and advantages, will become more fully apparent upon consideration of the following specification and accompanying drawing wherein there is disclosed an illustrated embodiment of the present invention.

Figure 1:
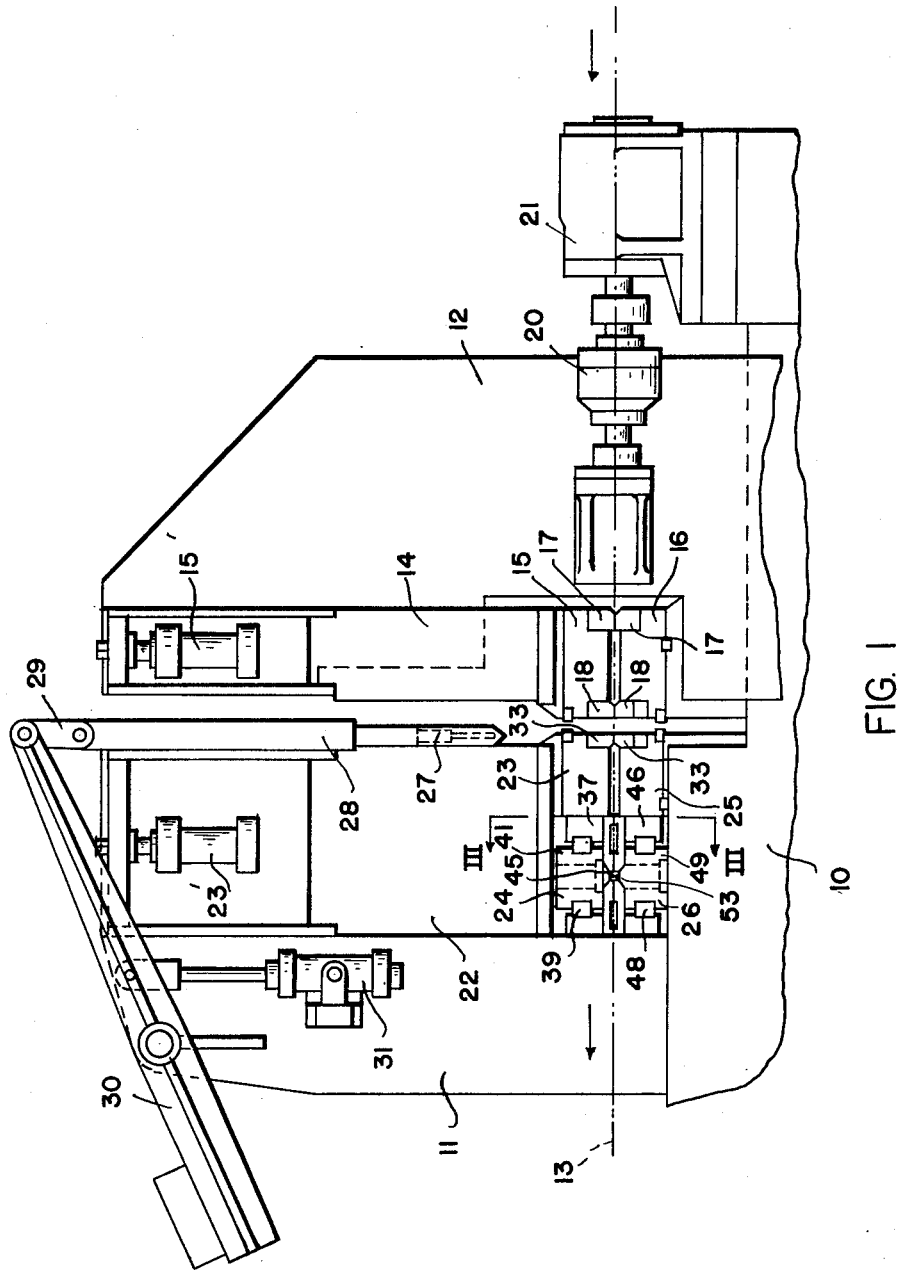
FIGURE 1 is a side elevational view of flash welding and trimming apparatus constructed in accordance with the teachings of this invention.
Figure 2:
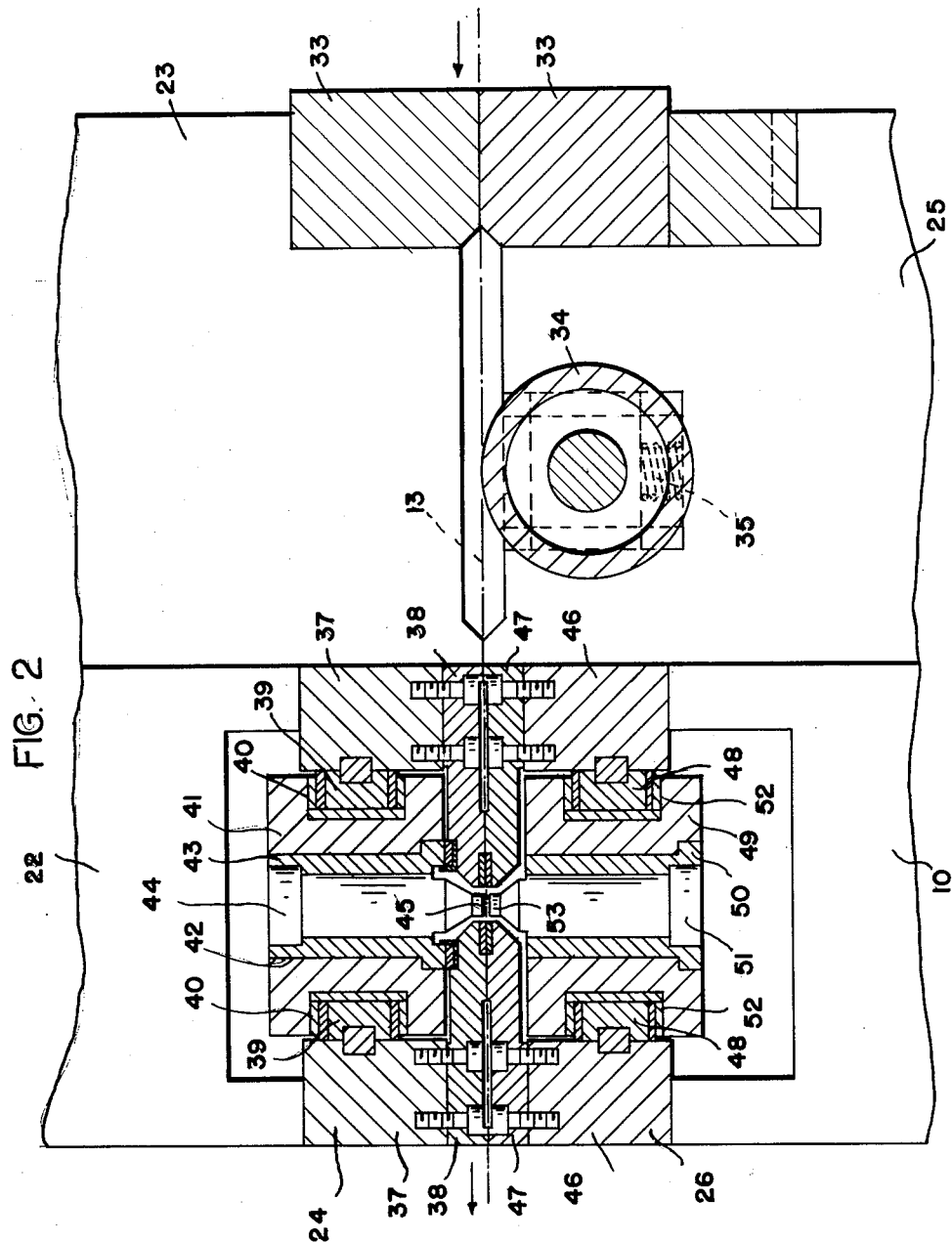
FIGURE 2 is an enlarged fragmentary side sectional view depicting a portion of the welding means and the flash trimming means employed in the apparatus of FIGURE 1.

Referring now the drawing, the reference numeral 10 designates a base structure upon which are mounted a pair of longitudinally spaced and inwardly facing housing members 11 and 12. The housing members 11 and 12 are disposed in spanning relation with respect to a normal path of workpiece travel 13 and the direction of workpiece travel is designated by arrows in the drawing. The housing member 12 is slidably mounted for longitudinal movement on the base structure 10 whereby the same is adapted to be moved toward and away from the relatively fixed housing member 11. Mounted for vertical sliding movement on the movable housing member 12 is a carrier 14. A fluid cylinder 15' is provided for effecting vertical movement of the carrier and other fluid clamping cylinders are also mounted from the movable housing member. Attached to the lower end of the carrier 14 is an upper welding die assembly 15 while a similar and cooperating lower welding die assembly 16 is mounted directly on the movable housing member 12. The upper and lower welding die assemblies 15 and 16 each comprise a pressure bar 17 and an electrode bar 18 that extend transversely across the normal path of workpiece travel. The arrangement is such that the leading end of a workpiece is adapted to be very quickly rigidly clamped between the upper and lower welding die assemblies 15 and 16 upon proper actuation of the fluid cylinder 15' and other fluid clamping cylinders, not shown. The welding die assemblies 15 and 16 are preferably constructed in accordance with the teachings of co-pending U.S. patent application Serial No. 13,111, filed March 7, 1960, which is assigned to the assignee of the present invention.

The movable housing member 12 is moved longitudinally by pairs of fluid cylinders 20 and 21 which are disposed on opposite sides of the normal path of workpiece travel. This actuating apparatus is preferably constructed and operated in accordance with the teachings of U.S. Patent No. 2,794,111, which is assigned to the assignee of the present invention.

The housing member 11 mounts the carrier 22 which is adapted to be moved vertically upon proper actuation of fluid cylinder 23' and other clamping cylinders, not shown. Attached to the lower end of the carrier 22 is an upper welding die assembly 23 comprising an upper flash trimming assembly 24. A lower welding die assembly 25 comprising a lower weld trimming assembly 26 is mounted from the housing member 11. As will be hereinafter more fully explained, the flash trimming assemblies 24 and 26 are adapted to cooperate in removing the welding flash or expulsion from the welded workpieces.

Also carried by the stationary housing member 11 is a spacer bar 27 having a plurality of stepped parallel gauging faces which extend transversely across the normal path of workpiece travel. The spacer bar 27 is rigidly secured to a vertically disposed carrier 28 which is pivoted at its upper end to a short link 29. The link 29 is in turn pivotally secured to an arm 30 that is adapted to be pivoted vertically by a fluid cylinder 31. The spacer bar 27 is caused to move vertically and also horizontally since there is a horizontal component of movement in the arcuate movement of the arm 30. The construction and operation of this gauge bar means is more fully disclosed in U.S. Patent No. 2,758,184, which is also assigned to the assignee of this invention.

Each of the upper and lower welding die assemblies 23 and 25 associated with the stationary housing member 11 comprises a current conductive electrode bar 33 which extends transversely across the normal path of workpiece travel. The electrode bars 33, as well as the electrode bars 18, are formed from current conductive material and means, not shown, are provided for connecting the same to opposite terminals of a welding current supply source, such as the output terminals of a welding transformer, for example. When the workpieces are clamped between the welding die assemblies 15—16 and 23—25, welding current is supplied to the ends thereof through the electrode bars 18 and 33.

The lower welding die assembly 25 further comprises a transversely extending workpiece supporting roll 34 which is disposed longitudinally of the electrode bars 33. The workpiece supporting roll 34 is biased upwardly by coil springs 35 and is adapted, when the welding die assemblies 23 and 25 are separated, to support the workpieces traveling through the flash welding and trimming apparatus in elevated relation with respect to the lower electrode bar 33 and the lower flash trimming assembly 26. This protects the lower welding die assembly 25 and the lower flash trimming assembly 26 from damage by the moving workpieces and further, facilitates movement of the workpieces through the flash welding and trimming apparatus. However, when a workpiece is clamped by the welding die assemblies 23 and 25 and the flash trimming assemblies 24 and 26, the workpiece supporting roll 34 is retracted into the lower welding die assembly 25 whereby the same is out of interfering relation with respect to the workpiece during welding and trimming operations. If desired, a similar retractable workpiece supporting member, such as a stripper bar, may be mounted in the upper welding die assembly 23 above the workpiece supporting roll 34.

The upper flash trimming assembly 24 comprises a pair of longitudinally spaced and transversely extending mounting members 37 which are carried at the lower end of the carrier 22 on the housing member 11. Bolted to the lower faces of the mounting members 37 are longitudinally spaced upper clamping platens 38. The inner adjacent faces of the mounting members 37 carry longitudinally spaced and inwardly projecting slides 39 which extend transversely across the normal path of workpiece travel. Slidably mounted on the spaced slides 39 by means of the lined grooves 40 is a generally rectangular ram 41. The ram 41 has a transversely extending generally rectangular slot 42 therein and received within the slot are tool blocks 43. The tool blocks 43 define openings in which a plurality of transversely spaced removable tool holders 44 are received. Each of the tool holders 44 carries an adjustable trimming tool 45.

Figure 3:
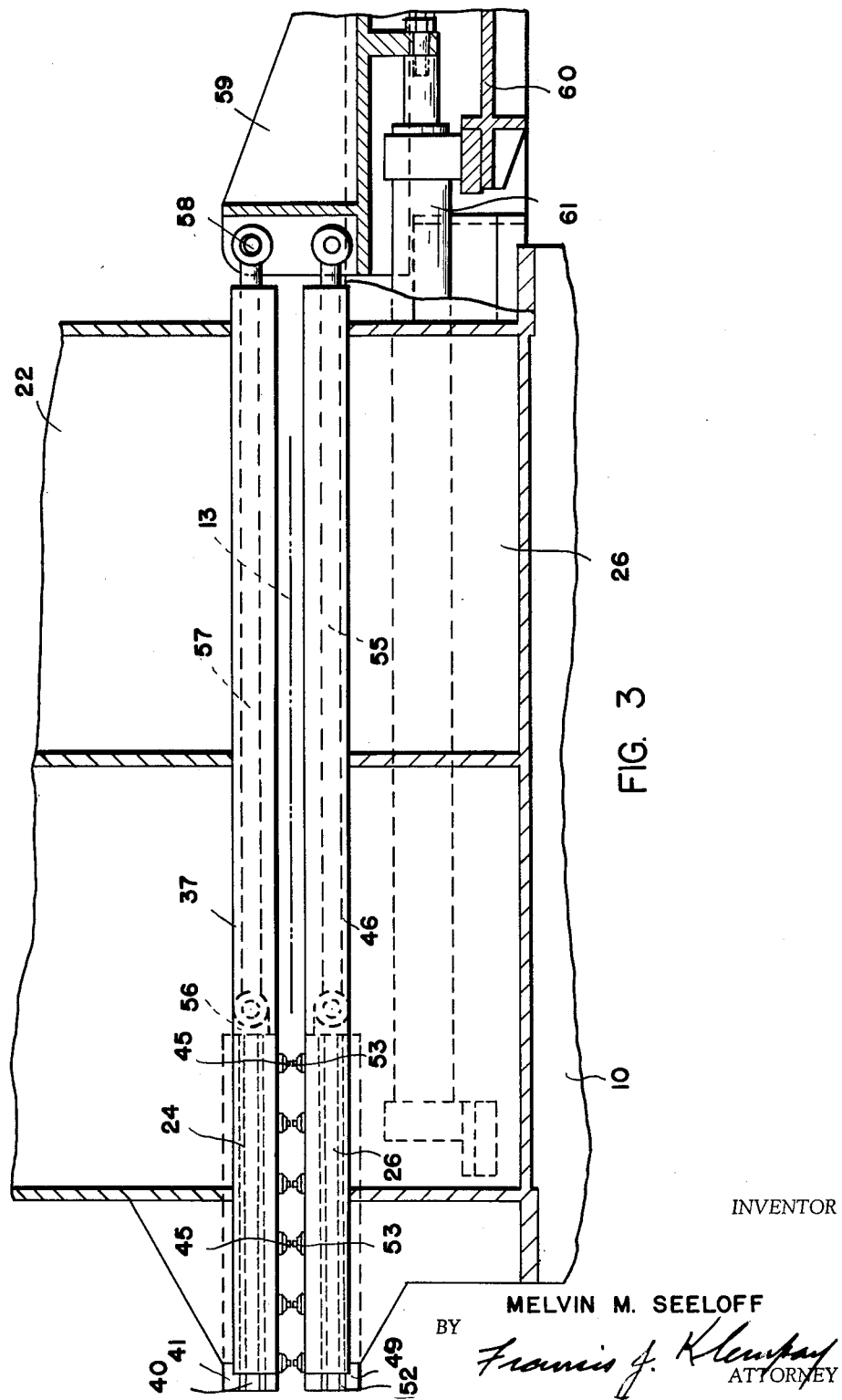
FIGURE 3 is a fragmentary end sectional view taken along the section line III—III of FIGURE 1.

The construction of the lower flash trimming assembly 26 is generally similar to that disclosed in connection with the upper flash trimming assembly. There are provided a pair of longitudinally spaced and transversely extending mounting members 46 which carry the longitudinally spaced lower clamping platens 47 and a pair of inwardly directed slides 48. A lower ram 49 having tool blocks 50 and removable tool holders 51 received therein is slidably mounted for transverse movement on the slides 48 by means of grooves 52. An adjustable trimming tool 53 is mounted in each of the tool holders 51 and it will be noted from FIGURE 3 of the drawing that the transversely spaced pairs of trimming tools 45 and 53 disposed above and below the normal path of workpiece travel are vertically aligned. Also, the pairs of trimming tools may be of different types to provide for the efficient removal of the welding flash.

The rear end of the upper ram 41 is pivotally attached by a clevis 56 to an elongated arm 57 which is in turn pivotally attached by means of a loose pivot connection 58 to a carriage 59. The lower ram 49 is also interconnected with the carriage 59 by means of an arm 55. The carriage 59 is supported for transverse sliding movement on an outwardly and transversely projecting supporting base 60 to one side of the normal path of workpiece travel and is adapted to be moved therealong upon proper actuation of a trimming cylinder 61 which is mounted in nesting relation below the lower flash trimming assembly. The arrangement is such that the upper and lower rams 41 and 49 are drawn across the normal path of workpiece travel to trim or skive the welding flash from the welded workpieces when the trimming cylinder 61 is properly actuated. It will be noted that the movement of the upper and lower rams 41 and 49 is synchronized by the drive connections comprising arms 57 and 55 but yet there is no interference between these drive connections and the workpieces. Also, the pivotal connection between the upper arm 57 and the upper ram 41 as well as the pivotal connection between the carriage 59 and the rear end of the arm 57 allows the upper weld trimming assembly 24 to be raised and lowered with respect to the lower weld trimming assembly 26.

Considering now the operation of the apparatus above described, it will be assumed that initially the upper welding die assembly 15 and the upper welding die assembly 23 comprising the upper trimming assembly 24 are retracted vertically. It will also be assumed that the movable housing member 12 is retracted longitudinally with respect to the relatively stationary housing member 11. A workpiece is now moved through the flash welding and trimming apparatus until the trailing end thereof is positioned past the center line of the flash welding and trimming apparatus. The spacer bar 27 is moved downwardly into a predetermined gauging position between the pairs of welding die assemblies 15—16 and 23—25 in an obstructing relation with respect to the normal path of workpiece travel. The adjacent ends of the workpieces are moved against the gauging surfaces of the spacer bar and, after the workpieces have been properly centered, the fluid cylinders 15' and 23' and the other fluid clamping cylinders are actuated to lower the upper welding die assemblies 15 and 23 and the upper flash trimming assembly 24. At this time the trailing workpiece end is clamped by the electrode bars 33 and the longitudinally spaced pairs of clamping platens 38 and 47. In this manner the trailing workpiece is very rigidly and firmly clamped without the necessity of ancillary and expensive pressure bars which have characterized prior art apparatus.

The housing member 12 is moved rearwardly a predetermined distance and the spacer bar 27 is retracted. The end of the leading workpiece clamped between the welding die assemblies 15 and 16 is now advanced toward the end of the trailing workpiece and welding current is supplied to the electrode bars 18 and 33. The electrical current causes flashing or arcing between the adjacent ends of the workpieces whereby the same are softened. Upon continued movement of the housing member 12 the ends of the workpieces engage each other and the actuating fluid cylinders 20 and 21 provide the necessary upset force which fuses and welds the ends of the workpieces to each other.

After the workpieces are welded, the upper welding die assemblies 15 and 23 and the upper trimming assembly 24 are retracted vertically to release the workpieces. Then the welded strips of workpieces are moved or indexed longitudinally until the center line of the weld is disposed along the center line of the flash trimming assemblies. It is preferred that indexing or transferring means be employed for very accurately and quickly advancing the welded workpieces from the center of the welding means to the center of the trimming means. Such indexing or transferring means may be of the type shown and disclosed in U.S. patent application Serial No. 660, filed January 5, 1960, which is assigned to the assignee of the present invention. With the weld accurately aligned with respect to the center line of the flash trimming means the fluid cylinder 23 is again actuated to lower the upper trimming assembly 24 and the upper welding die assembly 23 into clamping relation with respect to the welded workpieces. It will be noted that the pairs of clamping platens 38 and 47 clamp the welded workpieces on opposite sides of and closely adjacent to the weld while the welded workpieces are also clamped between the electrode bars 33. With the welded workpieces so clamped fluid is supplied to the trimmer cylinder 61 whereby the rams 41 and 49 are drawn transversely across the welded workpieces and the excess welding flash is removed by the cooperating pairs of tools 45 and 53. When the flash has been trimmed from the welded workpieces the upper welding die assembly 23 and the flash trimming assembly 24 are retracted so that the welded workpieces are free for movement through the flash welding and trimming apparatus. The trimming cylinder 61 is now reversely actuated to return the rams 41 and 52 to the position shown in FIGURE 3 of the drawing preparatory to a subsequent trimming operation.

It should now be apparent that the objects initially set forth have been accomplished. The trimming means for the flash welding and trimming apparatus is, in effect, mounted in the exit side flash welding die assemblies whereby the resultant apparatus is highly simplified and whereby the spacing between the welding means and the trimming means is reduced to an absolute minimum. Also, the clamping platens for the trimming means assist in very rigidly clamping the trailing workpiece during welding operations as well as clamping the welded workpieces during trimming operations.

Many changes may be made in the illustrated embodiment of the invention without departing from the clear teachings thereof. Accordingly, reference should be had to the appended claims in determining the true scope and intent of this invention.

I claim:

1. Apparatus for flash welding elongated workpieces such as strip in end-to-end relation and for trimming the welding flash from the line of weld comprising a first housing which is normally fixed in the longitudinal direction of workpiece travel through the apparatus and a second housing which is movable longitudinally with respect to the first housing, a welding clamp on the second housing comprising a pair of clamping electrode bars and a pair of clamping bars spaced longitudinally from said electrode bars, a welding clamp on said first housing comprising a normally fixed lower electrode bar as well as an upper electrode bar and a pair of lower and upper clamping bars, said lower and upper clamping bars being spaced longitudinally from said lower and upper electrode bars, a vertically movable carrier for said upper electrode and clamping bars, a lower tool slide guided on said first housing for transverse movement contiguous to said lower clamping bar, an upper tool slide guided on said carrier for transverse movement contiguous to said upper clamping bar, means to maintain said lower and upper tool slides aligned with respect to each other in a transverse direction and to move said slides transversely, and trimming tools mounted on said tool slides for engaging a line of weld in the joined workpieces closely adjacent one edge of said upper and lower clamping bars.

2. Flash welding and trimming apparatus of the type adapted to weld the adjacent ends of metal workpieces and trim the welding flash from the weld comprising a pair of longitudinally spaced housing members, said housing members spanning the normal path of workpiece travel, means to effect relative longitudinal movement between said housing members, each of said housing members mounting a pair of vertically aligned welding die assemblies adapted to clamp a workpiece therebetween, one of said pair of welding die assemblies comprising flash trimming means for trimming welding flash from the welded workpieces, said flash trimming means comprising a pair of vertically aligned flash trimming assemblies, each of said flash trimming assemblies having a longitudinally spaced pair of clamping platens, a ram guided for transverse movement across the normal path of workpiece travel between said clamping platens and mounting flash removing tools, means to transversely move said ram, said one of said pair of welding die assemblies comprising a pair of vertically aligned electrode bars adapted to clamp a workpiece therebetween, and said flash trimming assemblies being spaced longitudinally from said electrode bars.

3. Apparatus according to claim 2 further comprising a retractable workpiece supporting member adapted to support workpieces moving through said apparatus, and said workpiece supporting member being mounted longitudinally between said electrode bars and said flash trimming assemblies.

4. Flash welding and trimming apparatus of the type adapted to weld the adjacent ends of workpieces and remove the welding flash from the line of weld comprising a pair of longitudinally spaced and vertically aligned welding die assemblies, means to effect relative vertical movement between the ones of each of said pair of said welding die assemblies to clamp workpieces therebetween, one of said pairs of welding die assemblies comprising flash trimming means for removing welding flash from the line of weld, means to effect relative longitudinal movement between said pairs of welding die assemblies, said one of said pairs of welding die assemblies comprising a pair of vertically aligned electrode bars, pairs of vertically aligned clamping platens, and said clamping platens being spaced longitudinally from said electrode bars.

5. Apparatus according to claim 4 further comprising retractable workpiece supporting means disposed between said electrode bars and said clamping platens for supporting workpieces in spaced relation with respect to said electrode bars and said clamping platens when said flash welding die assemblies are vertically separated.

6. A flash welding and trimming unit comprising spaced welding die assemblies, means to effect relative movement between said welding die assemblies to clamp a workpiece therebetween, each of said die assemblies comprising an electrode bar and a flash trimming assembly, said flash trimming assemblies being spaced longitudinally from said electrode bars, each of said flash trimming assemblies comprising a pair of longitudinally spaced clamping platens, tool means mounted for movement between said clamping platens for removing welding flash from the line of weld, and a retractable workpiece supporting means disposed between said electrode bars and said trimming assemblies for supporting workpieces in spaced relation with respect to said electrode bars and said trimming assemblies when said welding die assemblies are separated.

References Cited in the file of this patent
UNITED STATES PATENTS

| | | |
|---|---|---|
| 2,314,656 | Morton | Mar. 23, 1943 |
| 2,875,319 | Stieglitz | Feb. 24, 1959 |
| 2,877,337 | Evans | Mar. 10, 1959 |